United States Patent
Hirata et al.

(10) Patent No.: US 11,137,779 B2
(45) Date of Patent: Oct. 5, 2021

(54) FLUID CONTROL DEVICE, METHOD FOR CONTROLLING FLUID CONTROL DEVICE, AND FLUID CONTROL SYSTEM

(71) Applicant: FUJIKIN INCORPORATED, Osaka (JP)

(72) Inventors: Kaoru Hirata, Osaka (JP); Katsuyuki Sugita, Osaka (JP); Yohei Sawada, Osaka (JP); Masahiko Takimoto, Osaka (JP); Kouji Nishino, Osaka (JP)

(73) Assignee: FUJIKIN INCORPORATED, Osaka (JP)

(*) Notice: Subject to any disclaimer, the term of this patent is extended or adjusted under 35 U.S.C. 154(b) by 41 days.

(21) Appl. No.: 16/094,252

(22) PCT Filed: Apr. 21, 2017

(86) PCT No.: PCT/JP2017/015974
§ 371 (c)(1),
(2) Date: Oct. 17, 2018

(87) PCT Pub. No.: WO2017/188129
PCT Pub. Date: Nov. 2, 2017

(65) Prior Publication Data
US 2019/0129452 A1    May 2, 2019

(30) Foreign Application Priority Data
Apr. 28, 2016   (JP) .............................. JP2016-090508

(51) Int. Cl.
*G05D 7/06*      (2006.01)
*F16K 31/00*     (2006.01)
(Continued)

(52) U.S. Cl.
CPC ......... *G05D 7/0635* (2013.01); *F16K 31/004* (2013.01); *F16K 37/005* (2013.01);
(Continued)

(58) Field of Classification Search
None
See application file for complete search history.

(56) References Cited

U.S. PATENT DOCUMENTS

2012/0101744 A1   4/2012   Matsuura et al.
2013/0092258 A1   4/2013   Yasuda et al.
(Continued)

FOREIGN PATENT DOCUMENTS

CN      104737086 A      6/2015
EP      0 498 242 A2     8/1992
(Continued)

OTHER PUBLICATIONS

International Search Report issued in PCT/JP2017/015974; dated Aug. 1, 2017.

*Primary Examiner* — Mohammad Ali
*Assistant Examiner* — Saad M Kabir
(74) *Attorney, Agent, or Firm* — Studebaker & Brackett PC

(57) ABSTRACT

The fluid controller includes a fluid control module and an external control module. The fluid control module includes a control valve on a flow channel, a valve driver circuit that drives the control valve, a fluid meter on a flow channel, and a first processor that processes a signal output from the fluid meter. The external control module includes a second processor that processes a signal output from the first processor. The second processor outputs a valve control signal according to the signal of the fluid meter output from the first processor, the valve control signal is directly input to the valve driver circuit without through the first processor, and the valve driver circuit outputs a voltage that drives the control valve according to the valve control signal from the second processor.

14 Claims, 5 Drawing Sheets

(51) Int. Cl.
  *F16K 37/00*  (2006.01)
  *G05B 19/042*  (2006.01)
  *F16K 31/06*  (2006.01)
(52) U.S. Cl.
  CPC ............. *G05B 19/042* (2013.01); *G05D 7/06* (2013.01); *F16K 31/06* (2013.01); *G05B 2219/25312* (2013.01)

(56) References Cited

U.S. PATENT DOCUMENTS

| | | | |
|---|---|---|---|
| 2013/0267892 A1* | 10/2013 | Woolford | A61M 3/0258 |
| | | | 604/34 |
| 2015/0234390 A1 | 8/2015 | Koyomogi et al. | |
| 2015/0370260 A1 | 12/2015 | Takijiri et al. | |
| 2016/0327963 A1 | 11/2016 | Hirata et al. | |

FOREIGN PATENT DOCUMENTS

| | | |
|---|---|---|
| JP | 2012-107871 A | 6/2012 |
| JP | 2013-088946 A | 5/2013 |
| JP | 2015-138338 A | 7/2015 |
| JP | 2016-021219 A | 2/2016 |

\* cited by examiner

FLUID CONTROL DEVICE, METHOD FOR CONTROLLING FLUID CONTROL DEVICE, AND FLUID CONTROL SYSTEM

TECHNICAL FIELD

The present invention relates to a fluid controller, a method for controlling a fluid controller, and a fluid control system. It particularly relates to a fluid controller amenable to size reduction, as well as a method for controlling the same and a fluid control system having the same.

BACKGROUND ART

In order to control fluids such as raw material gas and etching gas in semiconductor manufacturing devices and chemical plants, various types of flow meters, pressure meters, and fluid controllers have been used. Among them, a pressure-type flow controller is capable of precise flow control for various fluids with a relatively simple mechanism formed of a combination of a piezo-actuated control valve and a restriction part (e.g., an orifice plate or a critical nozzle), and thus has been widely used.

In pressure-type flow controller, fluid control is performed utilizing the principle that when a critical expansion condition $P1/P2 \geq$ about 2 (P1: gas pressure on the upstream side of the restriction part, P2: gas pressure on the downstream side of the restriction part) is satisfied, the flow of gas passing through the restriction part is determined not by the downstream pressure P2 but by the upstream pressure P1. The critical expansion condition varies depending on the kind of gas or its temperature. When the critical expansion condition is satisfied, the flow rate Qc is given by the following equation, for example.

$$Qc = S \cdot C \cdot P1/T1^{1/2}$$

Here, S is the orifice cross-sectional area, C is a constant determined by the gas physical properties (flow factor), and T1 is the upstream gas temperature. The above equation shows that the flow rate Qc is proportional to the upstream pressure P1. Therefore, simply by controlling the upstream pressure P1 by adjusting the opening/closing of a control valve provided on the orifice upstream side, etc., the flow of gas flowing downstream can be precisely controlled.

In addition, a pressure-type flow controller in which a pressure sensor is provided not only on an upstream side of the restriction part but also on a downstream side of the restriction part is known. In such a pressure-type flow controller, even in the case where the difference between the upstream pressure P1 and the downstream pressure P2 is small, and the above critical expansion condition is not satisfied, the flow rate Qc can be calculated based on a predetermined calculation equation. $Qc = KP2^m(P1-P2)^n$ (here, K is a proportionality constant depending on the kind of fluid and the fluid temperature, and m and n are exponents derived from the actual flow rate).

CITATION LIST

Patent Literature

Patent Document 1: Japanese Laid-Open Patent Publication No. 2012-107871

Patent Document 2: Japanese Laid-Open Patent Publication No. 2016-21219

SUMMARY OF INVENTION

Technical Problem

The kind process gas used for semiconductor manufacturing tends to increase year by year, and, with such an increase, the number of gas supply lines and the number of fluid controllers used are also increasing. However, a semiconductor manufacturing device has connected thereto various instruments, and it is difficult to ensure a space to install a large number of fluid controllers in the vicinity of the semiconductor manufacturing device. Thus, in recent years, the development of ultra-thin fluid controllers significantly slimmed down than before (e.g., about 10 mm wide) has been advanced.

Patent Document 1 discloses a flow control system in which a plurality of flow meters have connected thereto a control instrument that collectively controls them. In the flow control system described in Patent Document 1, the plurality of flow meters are configure to have a common part, and the common part is included in the control instrument, thereby reducing the thickness of each flow meter. In addition, in each of the flow meters, relevant flow-calculation-associated data is stored. Using the flow-calculation-associated data acquired from the storage part of each flow meter and the measurement data, the control instrument calculates the flow measurement value.

In addition, Patent Document 2 describes a configuration for realizing the size reduction of a flow controller, in which data for diagnosis is transmitted to a device for diagnosis through a repeater interposed between a flow controller and a user information processor.

However, even if the thickness of a flow controller is minimized, when a control instrument connected thereto is provided in the vicinity of a semiconductor manufacturing device, the installation space may not be sufficiently reduced. For example, in the pressure-type flow controller including an upstream pressure sensor and a downstream pressure sensor described above, because the size reduction of internal elements is limited, it is not easy to also ensure a space for a control instrument in the vicinity of a semiconductor manufacturing device.

The present invention has been accomplished to solve the above problems. A main object thereof is to provide a fluid controller amenable to size and thickness reduction, as well as a method for controlling the same and a fluid control system having the same.

Solution to Problem

A fluid controller according to an embodiment of the present invention is a fluid controller including a fluid control module and an external control module. The fluid control module includes a flow channel, a control valve on the flow channel, a valve driver circuit that drives the control valve, a fluid meter provided on the flow channel, and a first processor that processes a signal output from the fluid meter. The external control module includes a second processor that processes a signal output from the first processor. The second processor outputs a valve control signal according to the signal of the fluid meter output from the first processor, the valve control signal is directly input to the valve driver circuit without through the first processor, and the valve driver circuit outputs a drive voltage that drives the control valve according to the valve control signal from the second processor.

In one embodiment, the signal from the fluid meter is A/D-converted before being output to the external control module.

In one embodiment, the second processor generates a PWM signal as the valve control signal, and the valve driver circuit generates a drive voltage according to the duty ratio of the PWM signal.

In one embodiment, the control valve is a piezo-actuated valve, and the valve driver circuit steps up or steps down the piezo actuator voltage based on the valve control signal.

In one embodiment, the fluid control module and the external control module each include a differential transmission interface part and are digitally communicated through a plurality of cables in a differential transmission mode.

In one embodiment, the second processor is configured to receive an information signal from an external device, the external control module and the external device are communicated by EtherCAT®, (hereinafter, "ETHERCAT") and the external control module includes an RJ45 connector.

In one embodiment, the fluid control module includes a memory, the memory has stored therein individual information associated with the fluid control module, and the second processor can read out the individual information.

In one embodiment, the fluid meter is a flow sensor or a pressure sensor.

In one embodiment, the fluid meter includes a restriction part provided on the flow channel, a first pressure sensor provided on the upstream side of the restriction part and the downstream side of the control valve, and a second pressure sensor provided on the downstream side of the restriction part.

In one embodiment, the fluid control module further includes a temperature sensor for measuring the gas temperature between the control valve and the restriction part.

In one embodiment, the fluid control module includes an orifice-built-in valve including an orifice member as the restriction part, an solenoid valve connected to the orifice-built-in valve, and a driver circuit for the solenoid valve, and the external control module directly outputs a signal for controlling the opening/closing of the solenoid valve to the driver circuit of the solenoid valve without through the first processor.

In a fluid control system according to an embodiment of the present invention, a plurality of gas supply lines are provided in parallel to one common gas supply line, and the plurality of gas supply lines each include any one of the above fluid controllers in such a manner that the fluid control module and the external control module establish a one-to-one relation.

In addition, in one embodiment, the fluid controller includes:

a fluid control module including a flow channel, a control valve for fluid control, a valve driver circuit that controls the degree of opening/closing of the control valve, a fluid meter provided on the flow channel, and a first processor that receives an output from the fluid meter; and an external control module disposed apart from the fluid control module and communicably connected to the fluid control module through a plurality of cables, the external control module including a second processor configured to receive a signal from the first processor and configured to output an information signal generated by the second processor to an external device or input an information signal from an external device to the second processor. The second processor receives a signal of the fluid meter from the first processor and generates a valve control signal based on the signal of the fluid meter, and the valve control signal is directly input to the valve driver circuit without through the first processor and converted into a drive voltage in the valve driver circuit to drive the control valve.

A method for controlling a fluid controller according to an embodiment of the present invention is a method for controlling a fluid controller including a fluid control module having a first processor and an external control module having a second processor. The method includes a step of outputting a flow signal from a flow meter provided in the fluid control module, a step of outputting the flow signal output from the flow meter to the second processor through the first processor, a step in which the second processor outputs a valve control signal based on the output flow signal, a step of outputting the output valve control signal to a valve driver circuit disposed in the fluid control module without through the first processor, and a step in which the valve driver circuit outputs a drive voltage based on the valve control signal, thereby driving a control valve installed on the flow channel.

Advantageous Effects of Invention

According to an embodiment of the present invention, a fluid controller amenable to size and thickness reduction can be provided, and also a safety-design fluid controller that ensures the safety of control provided.

DESCRIPTION OF EMBODIMENTS

Hereinafter, embodiments of the present invention will be described with reference to the drawings, but the present invention is not limited to the following embodiments.

Figure 1:
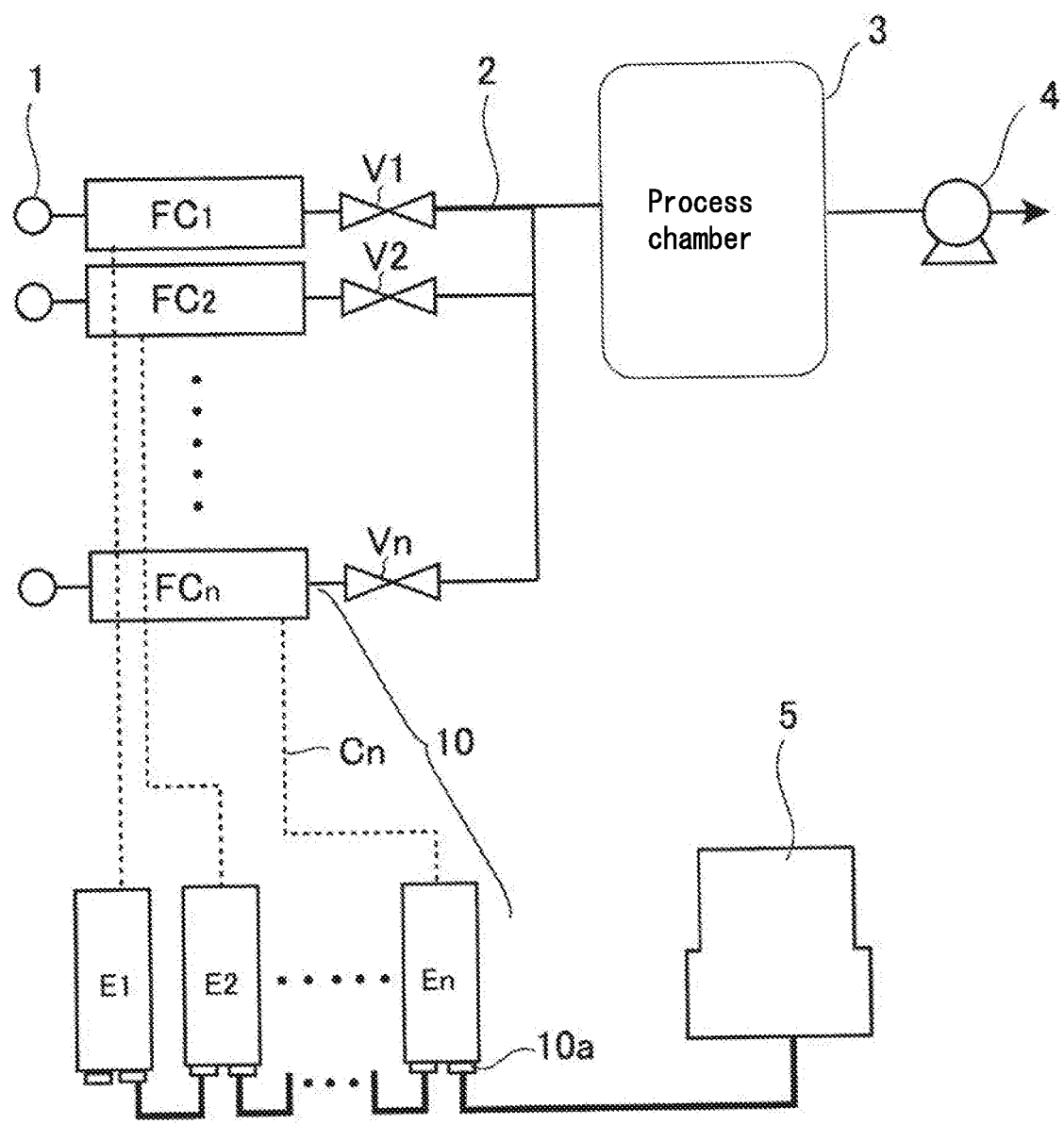
FIG. 1 A diagram showing an aspect is which a fluid controller according to an embodiment of the present invention is connected to a semiconductor manufacturing device.

FIG. 1 shows a fluid control system having incorporated therein a fluid controller according to an embodiment of the present invention. In the fluid control system shown in FIG. 1, n gas supply lines 2 are provided in parallel to one common gas supply line connected to a process chamber 3 of a semiconductor manufacturing device, and n fluid controllers 10 corresponding to n gas supply lines 2 are provided.

In each gas supply line 2, gas from a gas source 1 (raw material gas, etching gas, etc.) is supplied to the process chamber 3 with the flow and pressure being controlled by the fluid controller 10. The process chamber 3 has connected thereto a vacuum pump 4, and the inside of the process chamber 3 can be evacuated during the semiconductor manufacturing process. In addition, a downstream valve (open/close valve) Vn is provided in each gas supply line 2, and, through the downstream valve Vn in open state, only a necessary gas is supplied to the process chamber 3.

In this embodiment, each of the plurality of fluid controllers 10 includes a fluid control module FCn and an external control module En in a one-to-one relation. The fluid control module FCn and the external control module En are disposed apart from each other, and they are connected by a high-speed digital communication cable Cn. The cable Cn has a length of 0.5 m to 3 m, for example. The presence of the cable makes it possible to install the external control module En in a position apart from the fluid control module FCn installed in the vicinity of the process chamber 3.

In addition, the external control modules E1 to En are network-connected to an information processing device (external device) 5 through ETHERCAT. In the external control modules E1 to En, an RJ45 connector 10a corresponding to ETHERCAT is provided. Through the ETHERCAT cable connected thereto, the external control modules can communicate with the information processing device 5. The information processing device 5 may be a general-purpose computer equipped with a user input device, for example.

Figure 2:
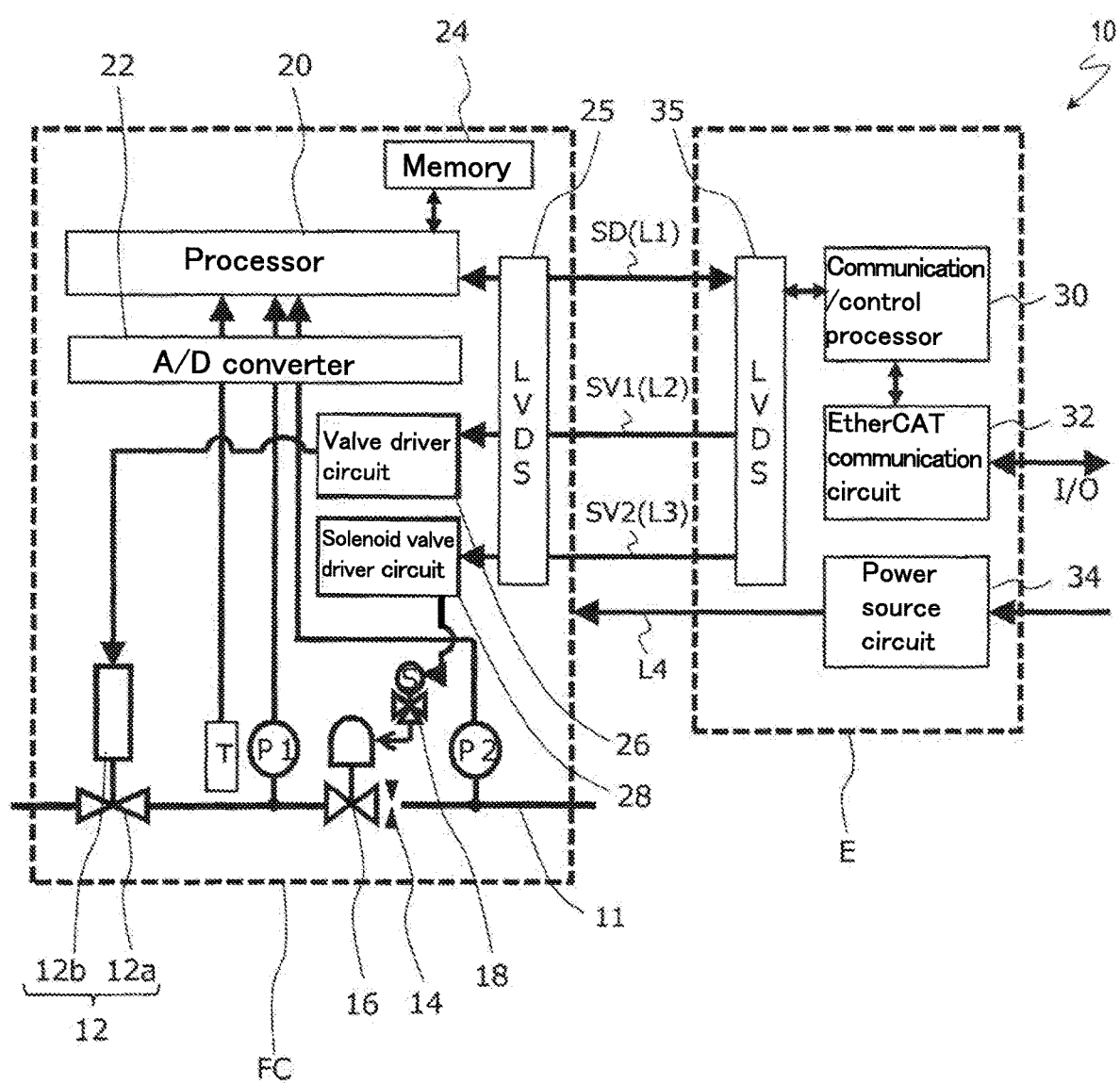
FIG. 2 A diagram showing the configuration of a fluid controller according to an embodiment of the present invention.

FIG. 2 is a diagram showing a pair of a fluid control module FC and an external control module E. As described above with reference to FIG. 1, the fluid control module FC and the external control module E are connected by a digital communication cable Cn. More specifically, through LVDS (Low voltage differential signaling) interface parts 25 and 35 provided in the respective modules, digital signals are communicated in a differential transmission mode.

LVDS is characterized by being capable of high-speed data transmission, and is further characterized by being capable of long-distance transmission while suppressing the noise. Therefore, by using LVDS, even when the fluid control module PC and the external control module E are spaced apart from each other, reliable, high-speed mutual communication can be realized.

In the above configuration, the fluid control module FC has a gas channel 11 and includes a restriction part 14 interposed in the gas channel, a first pressure sensor P1 and a temperature sensor T provided on the upstream side of the restriction part 14, a control valve 12 provided on the upstream side of the first pressure sensor P1, and a second pressure sensor P2 provided on the downstream side of the restriction part 14. The first pressure sensor P1 can measure the pressure of the flow channel between the control valve 12 and the restriction part 14, while the second pressure sensor P2 can measure the pressure on the downstream side of the restriction part 14 (e.g., the flow channel between the restriction part 14 and the downstream valve Vn (see FIG. 1)).

In this embodiment, the fluid control module FC has the same configuration as a pressure-type flow controller and, as a fluid meter provided on the flow channel, includes the first pressure sensor P1 and the second pressure sensor P2. However, the configuration is not limited thereto and may be such that the fluid control module PC includes fluid meters in other modes (e.g., flow sensor) in place of the first and second pressure sensors P1, P2 or in addition to the first and second pressure sensors P1, P2.

In addition, in the fluid control module PC shown in the figure, an orifice-built-in valve 16 integrally formed with the restriction part 14 is provided, and the orifice-built-in valve 16 has connected thereto an solenoid valve 18. The orifice-built-in valve 16 is typically an open close valve composed of a fluid operated valve (AOV, etc.). The supply of an operation (drive) fluid to the orifce-built-in valve 16 is controlled using the solenoid valve 18, whereby the orifice-built-in valve 16 is opened/closed. With the orifice-built-in valve 16, for example, an intermittent gas flow can be achieved, or gas to the process chamber can be shut off reliably at high speed. In this embodiment, the restriction part 14 is realized by an orifice member included in the orifce-built-in valve 16. However, the aspect is not limited thereto and may be such that in place of the orifice-built-in valve 16, a restriction part such as an orifice plate or a critical nozzle is provided independently of the valve.

In the fluid control module FC, the flow channel may be formed of a pipe or may also be formed as a hole provided in a metal block. The first pressure sensor P1 and the second pressure sensor P2 may each be a pressure sensor incorporating a monocrystalline silicon sensor chip and a diaphragm, for example. The temperature sensor may be a thermistor, for example. The control valve 12 may be a piezo-actuated valve having a metal diaphragm valve 12a and a piezo actuator 12b as an actuator, for example.

In addition, the fluid control module FC has a circuit board, and the circuit board includes an A/D converter (A/D converter circuit) 22, small-size processor (first processor) 20, a memory (EEPROM) 24, and an LVDS interface part 25. In this configuration, the outputs of the first pressure sensor P1, the second pressure sensor P2, and the temperature sensor T (i.e., outputs of fluid meters) are input to the A/D converter 22, converted into digital signals, and input to the small-size processor 20. The small-size processor 20 is capable of outputting the data signals SD to the external control module through the LVDS interface part 25 and the first cable L1.

Although a fluid meter may be configured in various ways, as used herein, the output of a fluid meter encompasses not only signals such as digital signals but also a voltage and the like. That is, everything output from the fluid meter is encompassed. In addition, FIG. 2 shows an aspect in which the A/D converter 22 and the small-size processor 20 are separate, but the A/D converter 22 may also be incorporated in the small-size processor 20. In this case, the output from the fluid meter is input as a digital signal to a processing part, through the A/D converter in the small-size processor.

In addition, the circuit board of the fluid control module FC includes a valve driver circuit 26 for controlling the control valve 12 and an solenoid valve driver circuit 28 for controlling the solenoid valve 18. However, the valve driver circuit 26 and the solenoid valve driver circuit 28 are not connected to the above small-size processor 20, and are configured to receive digital valve control signals SV1 and SV2 directly from the external control module E as described below.

Meanwhile, the circuit board of the external control module E includes a communication/control processor (second processor) 30, which is configured to receive a digital data signal SD from the small-size processor 20 of the fluid control module FC through the LVDS interface part 35, and an ETHERCAT communication circuit 32. In addition, as shown in the figure, the external control module E also includes a power source circuit 34 to be connected to an external power source (e.g., DC24V).

Figure 3:
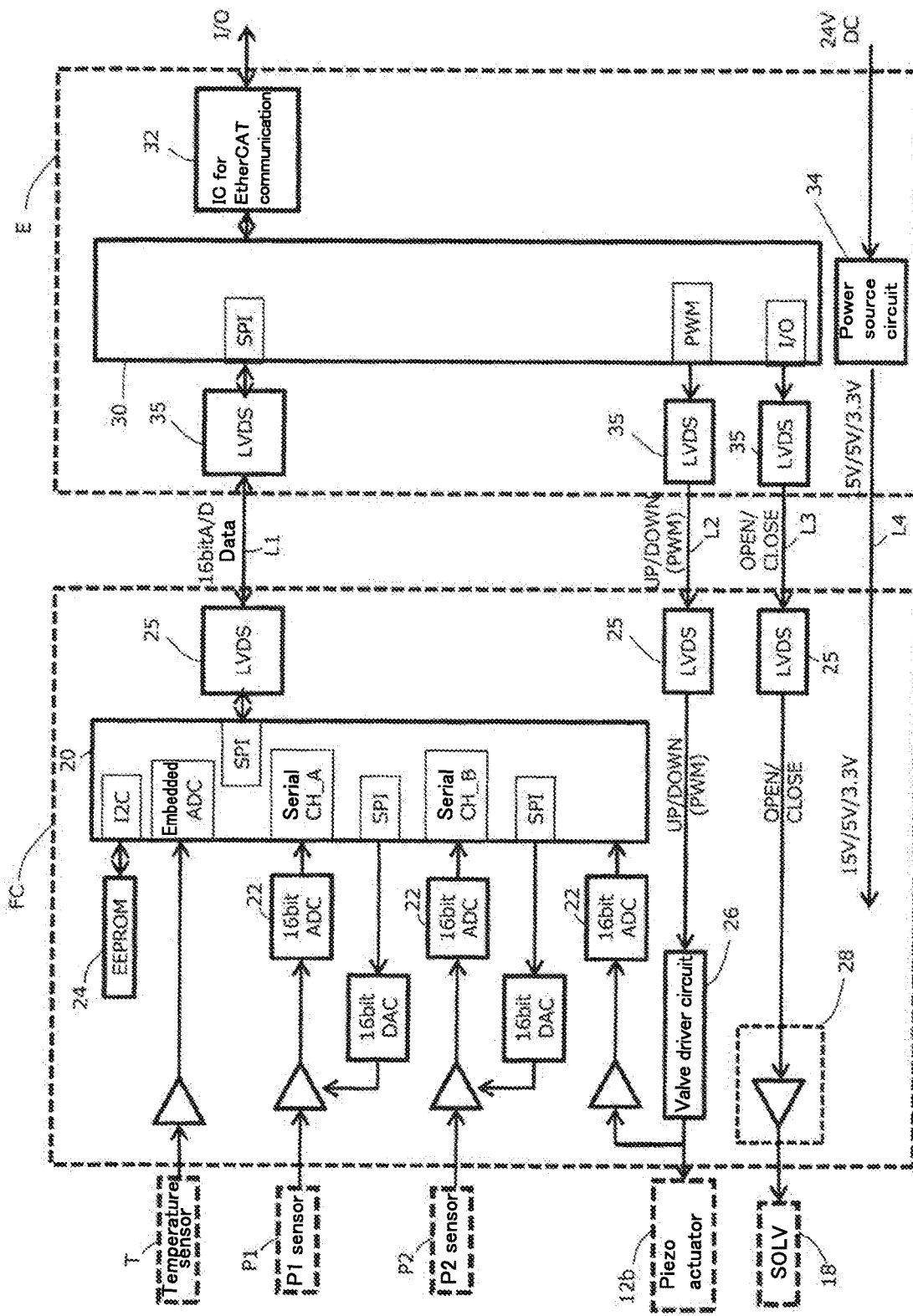
FIG. 3 A circuit diagram showing a fluid controller according to an embodiment of the present invention.

FIG. 3 is a diagram showing a specific example of the circuit configuration on the substrates of the fluid control module FC and the external control module E shown in FIG. 2. On the circuit board of the fluid control module FC, the A/D converter (A/D converter circuit) 22, the small-size processor (first processor) 20, the memory 24, and the LVDS interface part 25 are provided, while on the circuit board of the external control module E, the communication/control processor 30, the ETHERCAT communication circuit 32, the LVDS interface part 35, and the power source circuit 34 are provided.

As is clear with reference to FIG. 2 and FIG. 3, in the fluid controller 10 of this embodiment, the fluid control module FC and the external control module E are connected by a plurality of for digital communication cables L1 to L3 and a power source cable 14. More specifically, they are connected by the first cable L1 for transmitting a data signal between the small-size processor 20 and the communication/control processor 30, the second cable 12 for transmitting a flow control signal from the communication/control processor 30 to the valve driver circuit (here, piezo driver circuit) 26, the third cable 13 for transmitting an open/close signal from the communication/control processor 30 to the solenoid valve driver circuit 28, and the power source cable 14 for the supply of electricity at a predetermined voltage from the power source circuit 34 to the fluid control module FC.

In this configuration, the communication/control processor 30 can receive a digital pressure signal or temperature signal from the small-size processor 20 through the first cable L1. In addition, the communication/control processor 30 can also receive the fluid control module's individual information stored in the memory (here, EEPROM) 24 of the fluid control module FC through the small-size processor 20 and the first cable L1. As the first cable L1, in order to achieve two-way high-speed digital communication, a suitable cable having a length of 0.5 to 3 m can be used, for example.

The fluid control module's individual information stored in the memory 24 and read out from the communication/control processor 30 under control by the processor 20 includes, for example, the serial number, the flow range, the flow correction, the temperature characteristics of the pressure sensors, and the like. The communication/control processor 30 can suitably calculate the current flow rate using the read-out fluid control module's individual information.

Based on the received pressure signal, temperature signal, and fluid control module's individual information, the communication/control processor 30 generates a digital flow control signal. More specifically, first, the communication/control processor 30 calculates the current flow rate based on the input data signals including a pressure signal, a temperature signal, and the like. The flow rate can be calculated, for example, using the above predetermined calculation equation based on the upstream pressure and gas temperature when the critical expansion condition is satisfied or based on the upstream pressure, downstream pressure, and gas temperature when the critical expansion condition is not satisfied. In the calculation process, correction can be performed using the fluid control module's individual information to more precisely calculate the flow rate in such a fluid control module.

The communication/control processor 30 receives a set flow rate signal from an external device through the ETHERCAT communication circuit 32, then compares the calculated current flow rate (computed flow rate) with the set flow rate, and generates a valve control signal to eliminate the difference.

Here, the communication/control processor 30 generates, as a valve control signal, a PWM signal which is a pulse-width modulated digital signal. A PWM signal can be generated as follows; based on comparison between the set flow rate and the computed flow rate, the flow rate feedback-controlled to make agreement between the set flow rate and the computed flow rate, thereby adjusting the duty ratio of the PWM signal.

The generated PWM signal is transmitted to the fluid control module PC by the second cable 12 through the LVDS interface part 35 and input to the valve driver circuit 26 through the LVDS interface part 25. In this manner, the valve control signal (PWM signal) is directly input to the valve driver circuit 26 by the second cable 12 different from the first cable L1 without through the small-size processor 25. As the second cable L2, a suitable cable having a length of 0.5 to 3 m can be used, for example.

Figure 4:
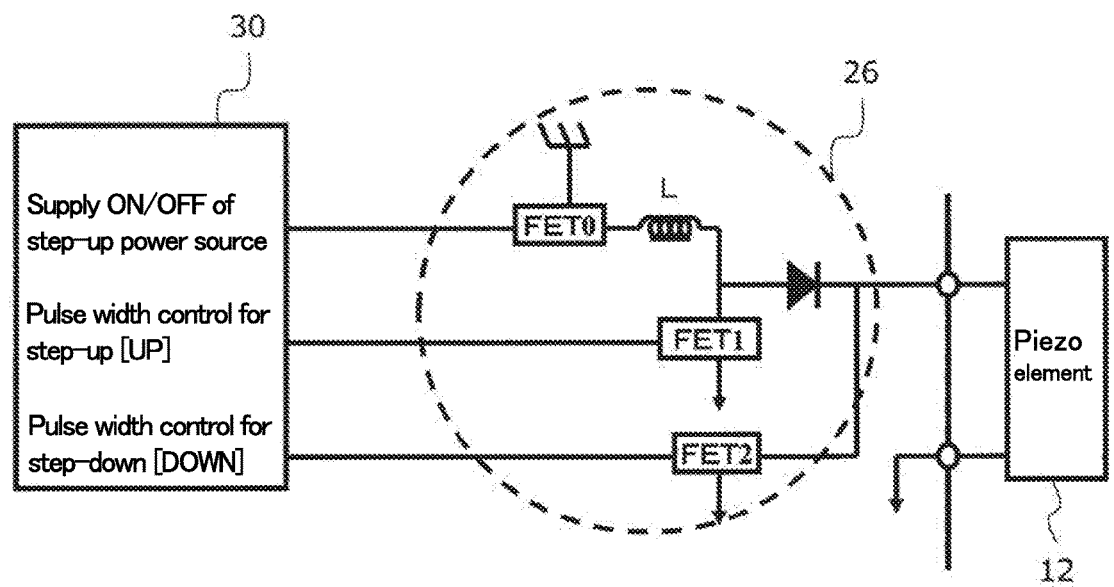
FIG. 4 A diagram showing an example of a piezo driver circuit according to an embodiment of the present invention.

The valve driver circuit 26 steps up or steps down the piezo actuator voltage based on the received valve control signal. FIG. 4 is a circuit diagram showing a configuration example of the valve driver circuit 26. In this embodiment, the valve driver circuit 26 is composed of a chopper-type step-up/step-down converter.

In a chopper-type step-up converter, in the state where the power source transistor (FET0) is kept ON and electricity is supplied, when the step-up transistor (FET1) is ON, energy is stored in a reactor (L), and, in an OFF state, the stored energy superimposed on the input voltage and output. Then, the condenser of the piezo actuator is charged with the output voltage and set at the drive voltage according to the amount of charge.

In the above circuit, a PWM signal as a valve control signal is input to the gate of the step-up transistor (FET1). The higher the duty ratio of the PWM signal, the greater the amount of energy accumulated in the reactor. As a result, with ON-OFF cycles of the step-up transistor (FET1), the voltage is stepped up according to the duty ratio, whereby the drive voltage of the piezo actuator rises. Similarly, when the drive voltage of the piezo actuator is to be reduced, a PWM signal having a low duty ratio is input to the gate of the step-down transistor (FET2) shown in the figure, whereby the piezo actuator voltage can be stepped down according to the duty ratio.

Figure 5:
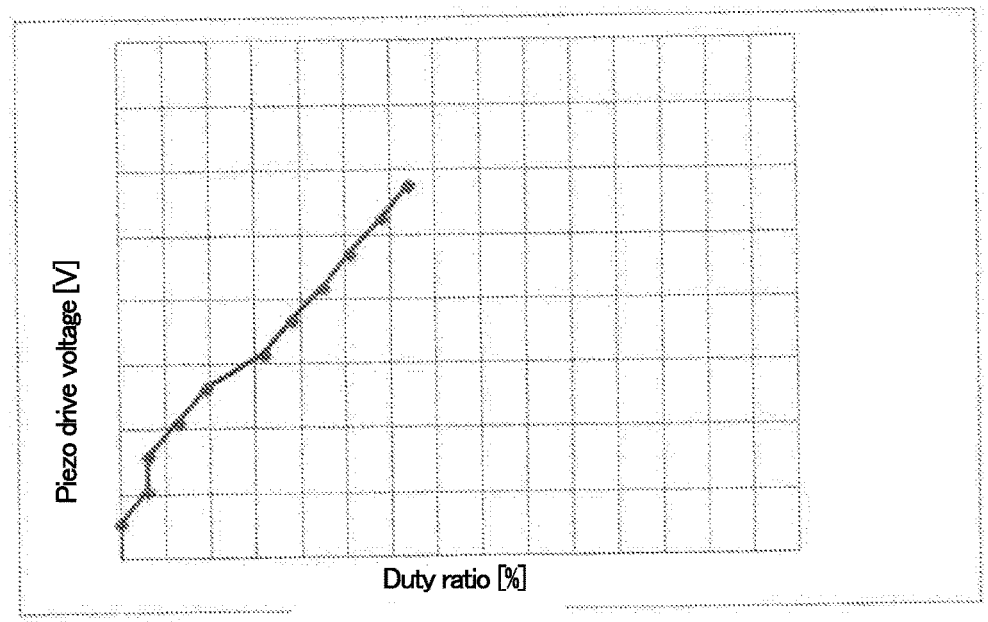
FIG. 5 A graph showing the relation between the duty ratio of a pulse signal (digital signal) applied to a piezo driver circuit and a drive voltage applied to a piezo element.

FIG. 5 is a graph showing the relation between the duty ratio of the PWM signal output from the external control module E and received in the valve driver circuit 26 and the drive voltage applied to the piezo actuator. As FIG. 5 shows, it can be seen that the drive voltage of the piezo actuator is set to be approximately proportional to the duty ratio of the PWM signal. Therefore, by outputting a PWM signal having a duty ratio corresponding to the desired drive voltage of the piezo actuator (i.e., the degree of opening/closing of the piezo-actuated valve), the external control module E can directly control the opening/closing action of the control valve 12. The valve driver circuit 26 is an analog circuit, and the relation between the duty ratio of a PWM signal and the valve drive voltage may vary among individual fluid control modules FC. Therefore, information showing the above relation may also be stored in the memory 24 as individual information and read out by the external control module E as necessary.

With reference to FIG. 2 and FIG. 3 again, the control/communication processor 30 of the external control module E of this embodiment directly outputs a digital open/close signal SV2 to the solenoid valve driver circuit 28 through the third cable L3. That is, the opening/closing action of the solenoid valve 18 is directly controlled by the external control module E without through the small-size processor 20 provided in the fluid control module PC.

In the fluid controller 10 configured as described above, the small-size processor 25 of the fluid control module FC only has to control the transmission of outputs from the first and second pressure sensors and the temperature sensor and control the transmission of individual information stored in the memory. Therefore, the circuit board, and eventually also the fluid control module FC, can be reduced in size. In addition, because an analog circuit containing individual differences is mounted on the fluid control module PC side, and individual information is stored in the memory, for example, even when the external control module E breaks down and is replaced with a new external control module E, simply by reading out individual information from the fluid control module FC, precise fluid control can be easily performed.

In addition, in a mode in which the fluid control module FC performs valve control, because the design is such that when communication with the external control module E is disconnected, the fluid control module FC side can freely perform the control, there is a possibility of the runaway of control. In contrast, in the fluid controller 10 of this embodiment, even when the fluid control module PC and the external control module are disconnected, because the external control module E controls the control valve and the solenoid valve, control is forcibly stopped, which is safe.

In this manner, the fluid control module FC can be reduced in size and configured to have a width of 10 mm or less, for example. Further, the number of hard wires connecting the fluid control module PC and the external control module E can be reduced. Therefore, the installation space in the vicinity of a semiconductor manufacturing device can be significantly reduced.

In addition, the external control module E, which is disposed apart from the fluid control module FC via a cable, may have a larger size than the fluid control module FC. Therefore, an RJ45 connector for ETHERCAT communication can be provided, making it possible to support high-speed communication with an external device.

Figure 6:
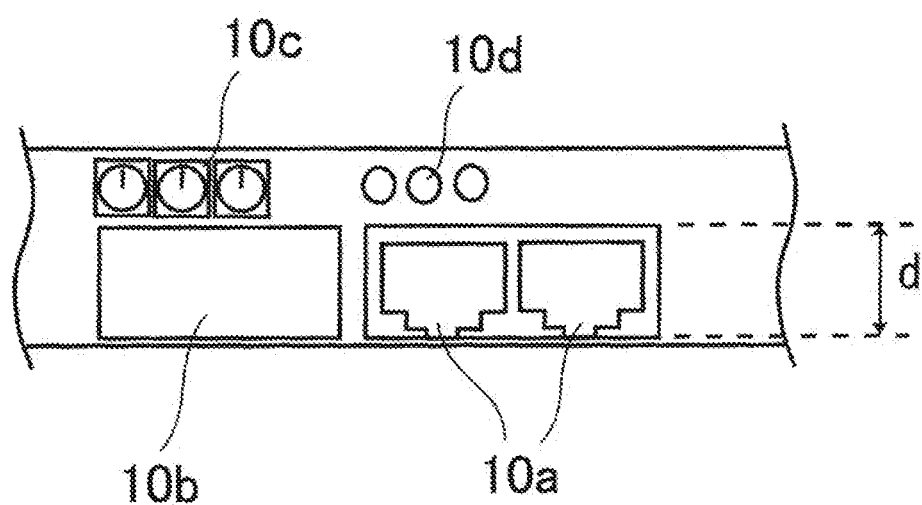
FIG. 6 A plan view showing a connector and so forth provided on the outer casing of an external control module that constitutes a fluid controller according to an embodiment of the present invention.

FIG. 6 is a plan view showing a connector and so forth provided on the outer casing (end surface) of the external control module E. The external control module E may include, as shown in the figure, RJ45 connectors 10a, a display device 10b, rotary switches 10c for setting the address of the external control module E, pilot lamps 10d to indicate a normal/abnormal state, and the like. The external control module E, may be positioned apart from a semiconductor manufacturing device and is not limited in size. Therefore, even RJ45 connectors 10a having a width d of about 13.5 mm can be easily mounted.

Embodiments of the present invention have been described above, but various alterations are possible. For example, by replacing with an external control module having a different communication mode, various communication modes can be supported using the same fluid control module. As the communication modes, in addition to the ETHERCAT communication described above, Devicenet communication, RS485 communication, and the like are applicable.

In addition, although the flow is measured using a pressure sensor in the example, needless to say, the flow may also be measured using a flow sensor.

INDUSTRIAL APPLICABILITY

The fluid controller according to an embodiment of the present invention is suitable, for example, for being connected to a gas supply line of semiconductor manufacturing and used to perform fluid control.

REFERENCE SIGNS LIST

1: Gas source
2: Gas supply line
3: Process chamber
4: Vacuum pump
5: Information processing device
10: Fluid controller
12: Control valve
12a: Diaphragm valve
12b: Piezo actuator
14: Restriction part
16: Orifice-built-in valve
18: Solenoid valve
PC: Fluid control module
E: External control module
P1: Upstream pressure sensor
P2: Downstream pressure sensor
T: Temperature sensor

The invention claimed is:

1. A fluid control system comprising:
a fluid controller comprising a plurality of fluid control modules and a plurality of external control modules disposed apart from the plurality of fluid control modules,
each of the plurality of fluid control modules including:
a flow channel;
a control valve on the flow channel;
a valve driver circuit that drives the control valve;
a fluid meter provided on the flow channel; and
a first processor that processes a signal output from the fluid meter,
each of the plurality of external control modules including
a second processor that processes a signal output from the first processor,
the fluid controller being configured such that the second processor outputs a valve control signal according to the signal of the fluid meter output from the first processor, the valve control signal is directly input to the valve driver circuit, and the valve driver circuit outputs a drive voltage that drives the control valve according to the valve control signal from the second processor;
one common gas supply line and a plurality of gas supply lines disposed in parallel to the one common gas supply line,
the plurality of gas supply lines each including one of the plurality of fluid control modules in such a manner that each of the plurality of fluid control modules and each of the plurality of external control modules establish a one-to-one relation, wherein
the plurality of the external control modules are contained in respective casings, the plurality of the external control modules in the casings are separately arranged from each other and the plurality of the external control modules are connected from each other by detachable signal cables.

2. The fluid control system according to claim 1, wherein the signal from the fluid meter is converted by an A/D converter before being output to the external control module.

3. The fluid control system according to claim 1, wherein the second processor generates a pulse-width modulated (PWM) signal as the valve control signal, and
the valve driver circuit generates a drive voltage according to a duty ratio of the pulse-width modulated (PWM) signal.

4. The fluid control system according to claim 3, wherein the control valve is a piezo-actuated valve, and the valve driver circuit steps up or steps down a voltage applied to the piezo actuator based on the valve control signal.

5. The fluid control system according to claim 1, wherein the fluid control module and the external control module each include a differential transmission interface part and are digitally communicated through a plurality of cables in a differential transmission mode.

6. The fluid control system according to claim 1, wherein the second processor is configured to receive an information signal from an external device, the external control module and the external device are communicated by an Ethernet-based fieldbus system, and the external control module includes an RJ45 connector.

7. The fluid control system according to claim 1, wherein the fluid control module includes a memory, the memory has stored therein individual information associated with the fluid control module, and the second processor can read out the individual information.

8. The fluid control system according to claim 1, wherein the fluid meter is a flow sensor or a pressure sensor.

9. The fluid control system according to claim 1, wherein the fluid meter includes a restriction part provided on the flow channel, a first pressure sensor provided on an upstream side of the restriction part and a downstream side of the control valve, and a second pressure sensor provided on a downstream side of the restriction part.

10. The fluid control system according to claim 9, wherein the fluid control module further includes a temperature sensor for measuring gas temperature between the control valve and the restriction part.

11. The fluid control system according to claim 9, wherein the fluid control module includes an orifice-built-in valve including an orifice member as the restriction part, an solenoid valve connected to the orifice-built-in valve, and a driver circuit for the solenoid valve, and the external control module directly outputs a signal for controlling the opening/closing of the solenoid valve to the driver circuit of the solenoid valve without through the first processor.

12. The fluid control system according to claim 1,
wherein each of the plurality of the external control modules is connected to the corresponding fluid control module by a digital communication cable, and
each of digital communication cables includes a first cable arranged between the first processor and the second processor and a second cable arranged between the valve driver circuit and the second processor, and each external control module is replaceable.

13. A method for controlling a fluid controller including a plurality of fluid control modules each having a first processor, a plurality of external control modules each having a second processor and a plurality of gas supply lines each including one of the plurality of fluid control modules in such a manner that each of the plurality of fluid control modules and each of the plurality of external control modules establish a one-to-one relation, wherein
the plurality of the external control modules are contained in respective casings, the plurality of the external control modules in the casings are separately arranged from each other and the plurality of the external control modules are connected from each other by detachable signal cables,
the method for controlling a fluid controller comprising:
a step of outputting a flow rate signal from a flow meter provided in each of the plurality of the fluid control modules;
a step of outputting the flow rate signal output from the flow meter to the second processor of each of the plurality of external control modules through the first processor;
a step in which the second processor outputs a valve control signal based on the output flow rate signal;
a step of outputting the output valve control signal to a valve driver circuit disposed in the fluid control module; and
a step in which the valve driver circuit outputs a drive voltage based on the valve control signal, thereby driving a control valve installed on the flow channel.

14. The method for controlling a fluid controller according to claim 13,
wherein each of the plurality of the external control modules is connected to the corresponding fluid control module by a digital communication cable, and
each of digital communication cables includes a first cable arranged between the first processor and the second processor and a second cable arranged between the valve driver circuit and the second processor, and each external control module is replaceable.

* * * * *